UNITED STATES PATENT OFFICE.

EDGAR T. HOLMBERG, OF CLEVELAND, OHIO, ASSIGNOR TO THE JAMES H. HERRON COMPANY, OF CLEVELAND, OHIO, A CORPORATION OF OHIO.

HEAT INSULATING AND RESISTING MATERIAL.

1,404,438.  Specification of Letters Patent.  Patented Jan. 24, 1922.

No Drawing.  Application filed April 7, 1919. Serial No. 288,134.

*To all whom it may concern:*

Be it known that I, EDGAR T. HOLMBERG, a citizen of the United States, residing at Cleveland, in the county of Cuyahoga and State of Ohio, have invented a certain new and useful Improvement in Heat Insulating and Resisting Materials.

This invention has for its object the provision of an improved composition of matter for heat insulating and heat resisting purposes, primarily developed for use in safes, metal cabinets, safety boxes, fireproof vaults, and the like, but also valuable for furnace linings, or coverings, boiler settings, hearths, and similar purposes. The objects of the invention are the provision of such material which shall be relatively inexpensive, light in weight, strong enough to withstand handling, shipment, and the ordinary incidents of use; one which shall resist disintegration by heat up to any temperature to which it will be exposed in use, and shall also resist atmospheric and chemical disintegration through lapse of time; one which shall possess little shrinkage and only a small coefficient of heat-expansion; while further objects of the invention will become apparent as the description proceeds.

In the preferred embodiment of my invention I employ a siliceous infusorial earth such as kieselguhr as a base and magnesium chloride as a binder; and according to certain refinements of my invention I reduce the shrinkage tendency of such a mixture either by compacting the substance under pressure or by incorporating therewith an additional ingredient such as calcined magnesia.

According to the simplest form of my invention, I wet the kieselguhr with sufficient of a nearly saturated solution of magnesium chloride to dampen the same thoroughly, the mass setting in a few hours to a weak hardness. I find it advantageous to press this material into molds prior to its setting, with a pressure up to about 100 pounds per square inch, which compacts the same to such a degree as largely to overcome its tendency to shrink upon setting, greatly increases its physical strength and hardness, and considerably increases its resistance to heat disintegration.

According to another and more complex form of my invention, I mix the dry kieselguhr with dry powdered magnesia, and afterwards wet the mixture with a nearly saturated solution of magnesium chloride. For most purposes, especially in safes and vaults, I find the most satisfactory composition to be that containing about 70 per cent of kieselguhr along with about 30 per cent of magnesia since these proportions operate to give a minimum of shrinkage, and a maximum of heat resistance, combined with a reasonable weight and cost factor. The purpose of the magnesia is essentially in this instance to neutralize or reduce the shrinkage, and above 30 per cent it produces little observable benefit, and the increase in weight produced thereby becomes a disadvantage, although the operating qualities of the material are retained through a much higher proportion and I do not limit myself against the use of a greater amount. Likewise a smaller amount is advantageous but in less degree; pressure improves all compositions of the material and becomes increasingly valuable as the magnesia content is decreased. Moreover the presence of the magnesia greatly expedites the setting and results in the production of a harder, stronger, and more resistant product.

By kieselguhr I mean any infusorial siliceous earth, whether friable or stony in form, and whether known as true kieselguhr, tripoli, rottenstone, etc. The magnesia is conveniently made by calcining white magnesite, it being only important that the content of iron oxide should be very small, since the iron if present would enter into chemical combination with the silica at high temperatures forming a fusible glass. However, electrolytic magnesia can equally well be employed, and in some instances other refractory oxides, such as lime, could be used for the same purpose, but I do not so much advocate the same particularly for high temperatures since the same would exhibit a greater tendency to enter into combination with the other ingredients than would the magnesia compound which possesses the same base as the binder. The magnesium chloride is prepared for use by dissolving the freshly fused anhydrous salt in substantially an equal weight of water and employing immediately in a quantity sufficient to moisten the mixture to the consistency of a very stiff mortar. The resulting mass is formed into bricks or blocks immediately, and sets very rapidly, pressure being preferably applied as aforesaid.

Such bricks or blocks will stand handling and shipping with little danger of becoming cracked and broken; they exhibit very little tendency to become disintegrated even in moist air, and when enclosed within protective walls their life appears to be indefinite; a four inch wall of the same easily withstands a temperature of 2000° Fahr. for four hours upon its one face without having the temperature of the opposite face raised as high as 300° Fahr. and without any tendency of cracking, melting, warping, scaling or disintegration, and in fact without showing any evidence of heat after recooling.

When used as a refractory lining for hearths and furnaces I usually increase the magnesia content in view of the great infusibility thereof and of the fact that its tendency to combine with other substances is less than that of silica; the preferable magnesia content for such purposes is from about 50% to about 75% of the whole. It is highly probable that at least a certain degree of combination takes place between the silica and the magnesia at elevated temperatures, but the highly refractory nature of pure magnesium silicate renders this unimportant.

It is important, however, that other substances such as iron, which tend to produce double silicates of low melting point, should be absent, and to this end it is a feature of my invention to employ a binder consisting of a salt of the same base.

While I have developed my improved composition chiefly for use in connection with devices which are or may be exposed to elevated temperatures, it is likewise of great value for refrigerators and refrigerating machinery. I do not in all cases restrict myself to the use of a siliceous material since other refractory oxides, such as tungstic oxide, chromic oxide, titanium oxide, and zirconium oxide can be employed in case the expense is warranted but for most practical purposes the silica is sufficient. Also I do not restrict myself to its use in a brick, or block form since it is sometimes more convenient to mold or pour it in place, and in general many changes can be made within the scope of my invention.

Having thus described my invention, what I claim is:—

A heat insulating and resisting material made by moistening a mixture of about 30% of magnesia and 70% of an infusorial siliceous earth with a saturated solution of magnesium chloride and compressing such moistened mixture in a mold.

In testimony whereof, I hereunto affix my signature.

EDGAR T. HOLMBERG.